UNITED STATES PATENT OFFICE.

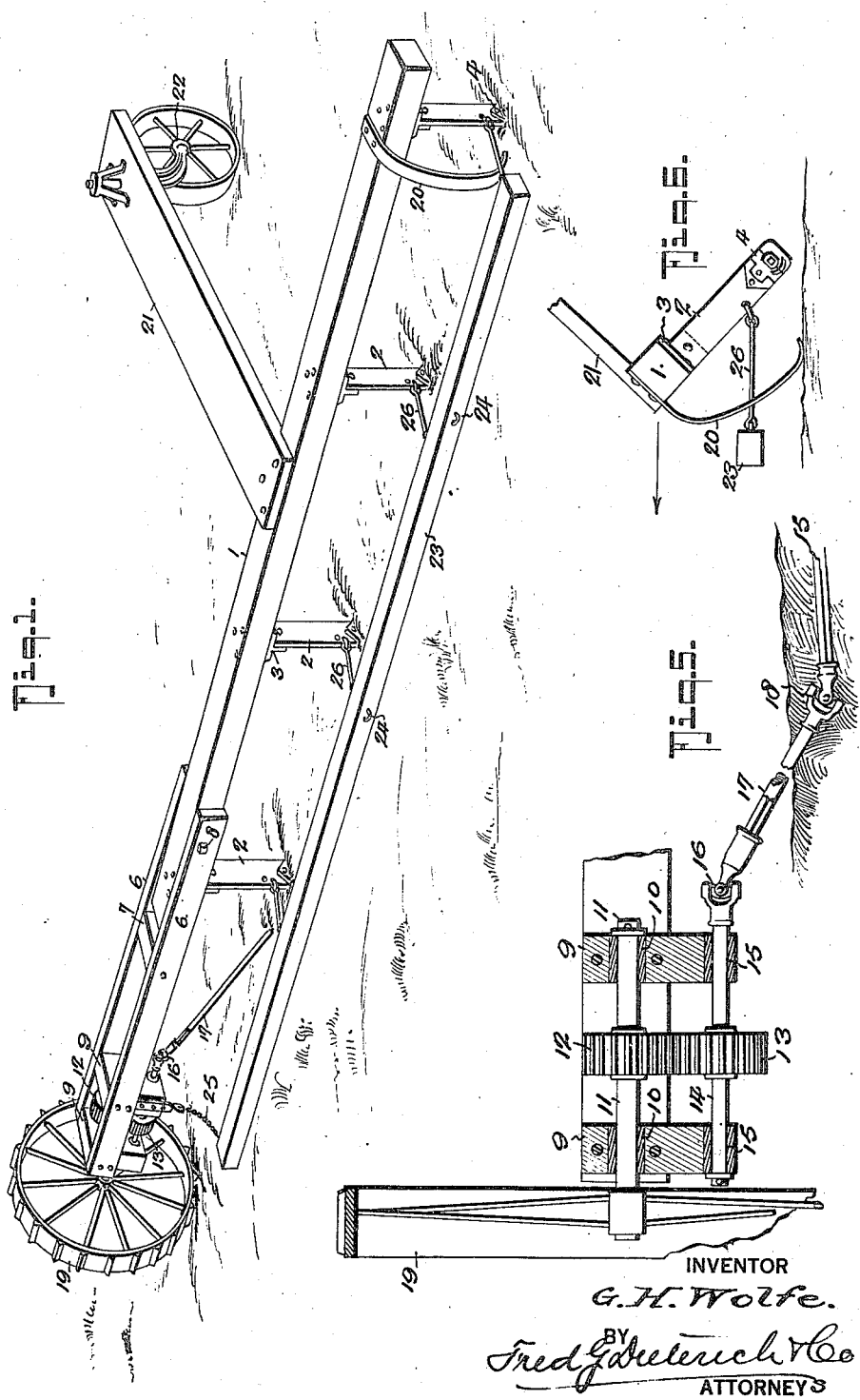

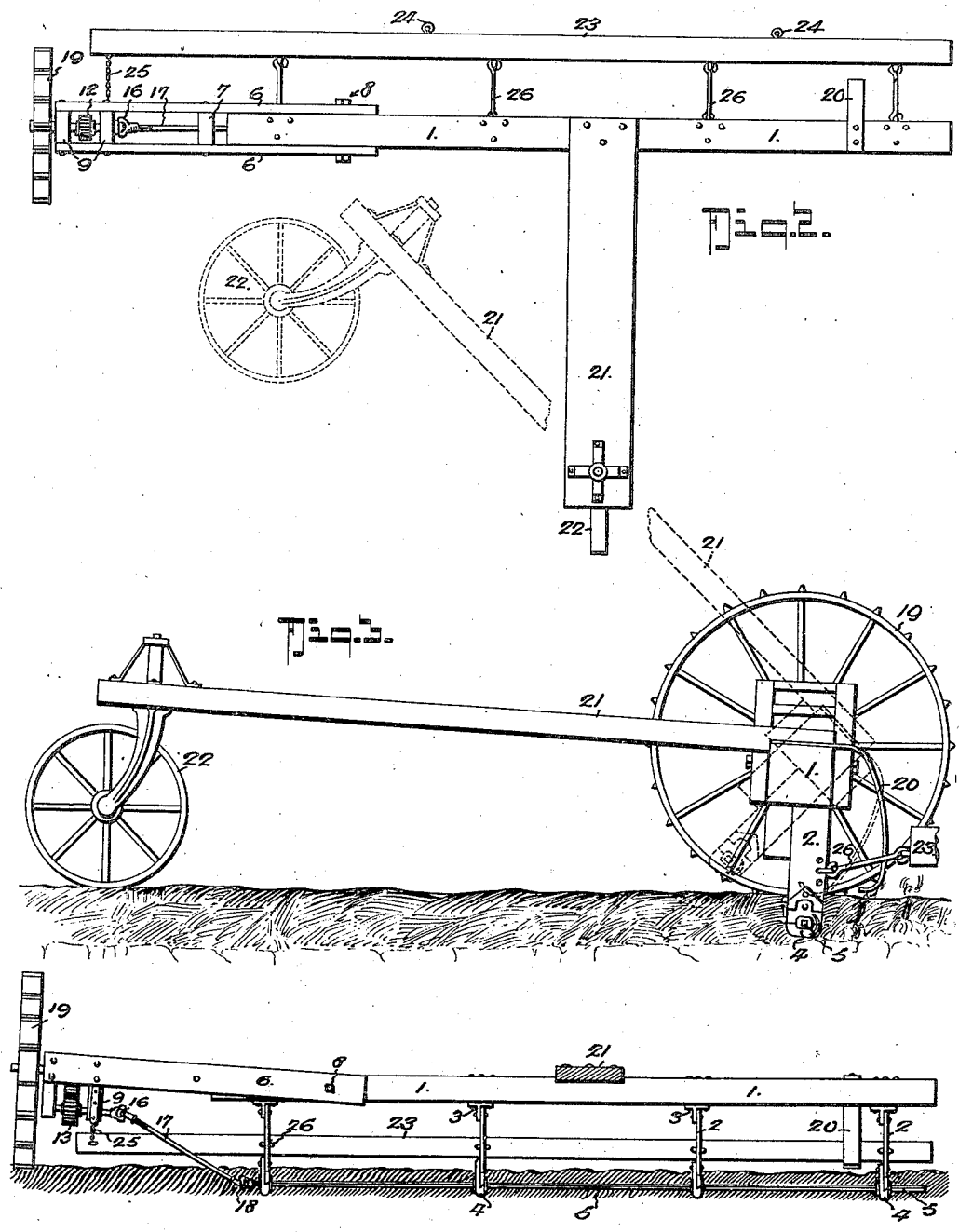

GARNETT H. WOLFE, OF CHENEY, WASHINGTON, ASSIGNOR TO ROTARY ROD WEEDER AND MANUFACTURING COMPANY, OF CHENEY, WASHINGTON, A CORPORATION.

ROTARY-ROD WEEDER.

1,232,149.   Specification of Letters Patent.   Patented July 3, 1917.

Application filed February 14, 1917. Serial No. 148,690.

*To all whom it may concern:*

Be it known that I, GARNETT H. WOLFE, residing at Cheney, in the county of Spokane and State of Washington, have invented certain new and useful Improvements in Rotary-Rod Weeders, of which the following is a specification.

My invention relates to the agricultural machinery art and especially to machines for use in operations on the soil for the purpose of destroying weeds and under-growth for leaving the soil in better condition for planting, etc.

In a patent granted January 10, 1911, and re-issued April 6, 1915, No. 13,899, on an application filed by Grover C. Wolfe and Henry K. Wolfe, there is disclosed a machine for the purpose which has been found, in practice, to be highly effective, but, owing to the expense of manufacture, it has not been possible to produce such a machine at a sufficiently low cost to put it within reach of the small farm operator whose investment must be carefully considered.

It is therefore the principal object of my invention to provide a cheap, light, yet effective machine, which will do the work with a lesser financial outlay than is required with the heavier machine of the patent referred to.

In its general make-up, the present invention comprises a T-frame, on one end of the cross beam of which is a traction wheel that imparts motion to the rotatable rod which is mounted in bearings on the lower end of pendent supports, the rear end of the longitudinal beam of the T-frame being supported by a caster wheel; the free end of the cross beam,—*i. e.*, that end opposite to the traction wheel, is supported by a runner bar when the T-frame is tilted up to withdraw the rotary rod from the ground; draft is applied through a hitch bar that is hinged to the pendent supports.

More subordinately the invention includes those novel features of construction, combination and arrangement of parts, all of which will be first fully described, then be specifically pointed out in the appended claims, reference being had to the accompanying drawings, in which:—

Figure 1 is a perspective view of the invention showing the traction wheel applied to the right hand side.

Fig. 2 is a top plan view of the invention showing the traction wheel as applied to the left hand side, (it being understood that the traction wheel may be applied to either the right hand or left hand side, as may be desired).

Fig. 3 is a side elevation of the structure shown in Fig. 2.

Fig. 4 is a rear elevation and part cross section of the structure shown in Fig. 2.

In the drawings, in which like numerals indicate like parts in all of the figures, it will be observed that the T-frame comprises the front transverse beam 1 and the rearwardly projecting beam 21.

On the under side of the beam 1 and spaced at suitable intervals apart is a series of brackets 3, which are suitably secured to the beam and from which the pendent supports 2 project. The supports 2 are provided at their lower ends with shaft bearings, preferably of the construction shown in my copending application filed on the 28th day of December, 1916, Serial No. 139,349.

Mounted to turn rotatably in the bearings 4 is a shaft 5, (see Fig. 4) which is driven through a power transmitting connection from a traction wheel 19. The traction wheel 19 is provided with a shaft 11 which is journaled in suitable bearings 10 in the blocks 9 of the extension frame 6, the frame 6 being pivotally secured at 8 to the beam 1 to project rearwardly from the same. 7 is a spacing block between the side bars of the extension frame 6.

The blocks 9 are also provided with bearings 15 in which a countershaft 14 is journaled, the shafts 11 and 14 being connected by spur gears 12 and 13, so that the rotation of the shaft 14 may be in the direction opposite to that of the shaft 11.

17 is a driving shaft composed of telescoping parts and connected at its ends through universal joints 16 and 18 with the shaft 14 and rod 5 respectively so that the motion of the countershaft 14 may be imparted to the rotatable rod 5.

20 is a runner bar which is secured to the end of the beam 1 opposite to that to which the extension frame 6 is secured, the runner bar 22 projecting downwardly in front of the beam 1 to a position in proximity to the ground surface when the machine is operating with the rod 5 below the ground, as shown in Fig. 1.

22 is a caster wheel that supports the rear end of the longitudinal beam 21.

23 is a hitch bar having suitable eyes 24 to which the draft harness for the beam may be connected, the hitch bar 23 being linked at 26 to the respective standards or pendent supports 2 and flexibly connected at 25 with one of the blocks 9 so that when draft is applied to the bar 23, the machine may be pulled forwardly.

The operator stands or sits on the beam 21 so as to give the required weight to the forward part of the structure to cause the rod 5 to be projected beneath the ground.

In practice, as the machine is moved over the ground with the rod 5 rotating beneath the surface, the weeds will be cut and macerated by the rotation of the rod 5 which, in practice, is preferably of angular cross section and is geared to rotate in a direction reverse to the direction of rotation of the traction wheel 9.

In practice, it sometimes occurs that the rod 5 meets an obstruction, either due to the location of immovable bodies beneath the surface of the ground, or to a packing up or tangling of the weed roots which makes it necessary to lift the rod 5 out of the ground. In order that this may be easily operated and the draft pull of the beam utilized for the purpose the operator simply gets off of the beam 21, takes hold of the rear end of the beam 21 and lifts it to the position indicated in dotted lines in Fig. 3 at the same time driving the team forwardly. This brings the runner bar 20 into engagement with the surface of the ground and acts as a fulcrum in connection with the fulcrum of the traction wheel 19 to pull the rod 5 out of the ground.

As soon as this has been done the beam 21 may be again lowered to its normal position and any entanglement of weeds or other debris which clogs the operation of the rods 5 may be removed and the machine continued in use.

Not only does the runner 20 serve to form a fulcrum (see Fig. 6) to coöperate with the fulcrum of the wheel in pulling the rod out of the ground but it also serves to limit the penetration of the pendent support at the free end of the cross beam 1 into the ground so that the beam 1 may be maintained substantially parallel with the surface of the ground during the operation of the machine (see full lines Fig. 3).

In this application, I make no claim, *per se*, to the shaft bearing 4, as that forms the subject-matter of my co-pending application referred to, although I find that when employed in connection with the other structural parts herein shown and described, a very effective weeder is produced and at a minimum expense, as the bearings are kept free from clogging and when worn can be replaced quickly and at very little cost.

It will be seen that the weight of the operator while on the beam 21, together with the weight of the machine itself serves to force and maintain the rod 5 in the ground, while the machine is being drawn across the field, the beam 21 acting as a lever, with the caster wheel-ground-contact as the fulcrum. The operator by moving forwardly or backwardly on the beam 21 may apply more or less penetrating force to the front end of the structure in causing the rod 5 to enter or remain in the ground, as the position of the operator largely determines the leverage of the beam 21 with relation to its fulcrum at the caster wheel-ground-line of contact, which will be clear to those skilled in the art.

From the foregoing description, taken in connection with the accompanying drawings, it is thought the complete construction, operation and advantages of my invention will be readily understood by those skilled in the art.

What I claim is:—

1. In a weeder, a frame comprising a front transverse beam and a rearwardly extending longitudinal beam, a caster wheel sustaining the rear end of the longitudinal beam, pendent supports mounted on the transverse beam, rod bearings at the lower ends of said supports which are adapted to enter below the surface of the ground, a rotatable rod journaled in said bearings, a hitch bar connected to said pendent supports and means to rotate said rod.

2. In a weeder, a frame comprising a front transverse beam and a rearwardly extending longitudinal beam, a caster wheel sustaining the rear end of the longitudinal beam, pendent supports mounted on said transverse beam, rod bearings on the lower ends of said supports which are adapted to enter below the surface of the ground, a rotatable rod mounted in said bearings, a transverse extension frame hinged to one end of said transverse bar, a traction wheel having a shaft mounted in bearings in said extension frame, power transmitting elements between said wheel and said rotatable rod and a hitch bar connected with said pendent supports.

3. In a weeder, a frame comprising a front transverse beam and a rearwardly extending longitudinal beam, a caster wheel sustaining the rear end of the longitudinal beam, pendent supports mounted on said transverse beam, rod bearings on the lower ends of said supports which are adapted to enter below the surface of the ground, a rotatable rod mounted in said bearings, a transverse extension frame hinged to one end of said transverse bar, a traction wheel having a shaft mounted in bearings in said extension frame, power transmitting elements between said wheel and said rotatable rod, a hitch bar connected with said pendent supports, and a runner bar on the transverse beam on the end opposite to the traction wheel.

4. In a weeder, a frame comprising a front transverse beam and a rearwardly extending longitudinal beam, a device for sustaining the rear end of the longitudinal beam above the ground, pendent supports mounted on the beam, rod bearings at the lower ends of said supports which are adapted to enter below the surface of the ground, a rod rotatably mounted in said bearings, a hitch bar connected with said pendent supports, means at one end of said transverse beam and including power transmitting connections with said rotatable rod for rotating the same, and means on the other end of said transverse beam for holding said other end of said transverse beam out of contact with the ground when said frame is turned by elevating the rear end of said longitudinal beam.

G. H. WOLFE.